United States Patent [19]

Prell

[11] Patent Number: 4,795,896

[45] Date of Patent: Jan. 3, 1989

[54] WEATHER RESISTANT CARD READER

[75] Inventor: Edward T. Prell, Sausalito, Calif.

[73] Assignee: Schlage Lock Company, San Francisco, Calif.

[21] Appl. No.: 142,002

[22] Filed: Jan. 11, 1988

[51] Int. Cl.[4] .......................................... G06K 13/00
[52] U.S. Cl. .................................................. 235/482
[58] Field of Search ......................................... 235/482

[56] References Cited

U.S. PATENT DOCUMENTS 3,976,858  8/1976  Haun .................................... 235/482

Primary Examiner—Harold I. Pitts
Attorney, Agent, or Firm—Walter C. Vliet

[57] ABSTRACT

Disclosed is a weather resistant card reader utilizing a resilient cantilevered leaf spring which provides line contact to seal the card reader from the elements during nonuse and readily permits the insertion of a card for reading when desired. The pressure exerted by the spring on the card also serves to stabilize the card during the reading process and further provides a feel that is desirable in swiping the card through the slot.

3 Claims, 2 Drawing Sheets

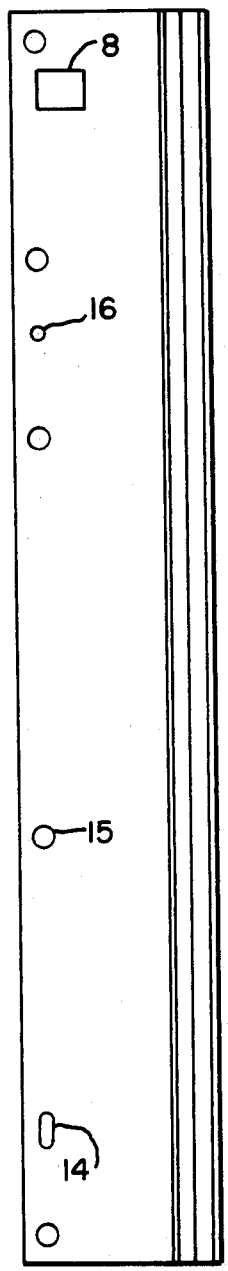
FIG. 4
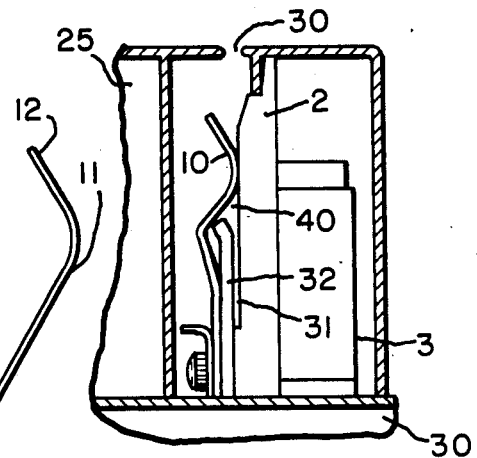
FIG. 6
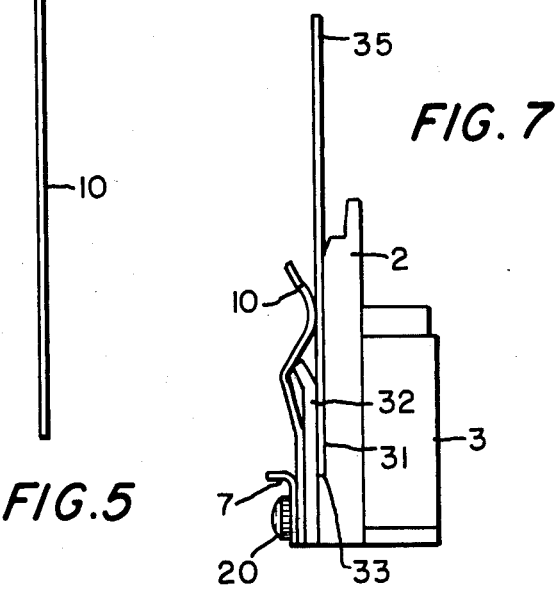
FIG. 5
FIG. 7

WEATHER RESISTANT CARD READER

BACKGROUND OF THE INVENTION

Magnetic card readers and the like have come into common usage for transfer of information in such applications as electronic door locks, automatic bank tellers, entry identification, and the like. In the past these devices have been subject to accumulations of moisture and/or dirt during operation in both indoor and outdoor applications. Since the card reader is primarily an electronic device it is particularly subject to damage as a result of moisture in form of water droplets entering the electronics.

Several methods have been attempted including the use of thin membranes and the like to seal the electronics from external water. These have been successful in many applications but in certain other applications it introduces a degree of error or short life that can be unacceptable. In addition, if a card reader slot is made too wide the card progresses through the slot with a very sloppy fit and feel. If the slot is made too narrow there are problems inserting the card accurately and any amount of debris that may enter with the card can jam and scratch the critical surfaces of the card.

The present invention addresses the requirement for weatherproofing a card reader slot without need for entirely covering over the slot or reading the card through, for example, a thin film membrane. In addition, the feel of card handling is improved while card damage is minimized.

OBJECTS OF THE INVENTION

The object of the present invention therefore is to provide a weather resistant closure for a magnetic card reader which eliminates the problem of foreign matter entering the slot and in addition improves the fit and feel of the card in the slot so as to improve data reading and avoid card damage. The sealing device of the present invention has for an object an inexpensive and easy to manufacture device. These and other objects are obtained in a card reader sealing device comprising: a card reader mounted in a planar support frame; a cantilevered leaf spring in adjacent parallel relationship with said planar support plate; the spring being further provided with a bent tab sealing surface at its edge which alternatively cooperates with the card or card reader frame or mounting plate to form a line contact seal which isolates the card reader from the environment.

BRIEF DESCRIPTION OF THE DRAWINGS

FIG. 4 is a side view of the sealing spring according to the present invention.

FIG. 5 shows an end view of the sealing spring according to the present invention showing its unique bent end tab.

FIG. 6 shows an end view assembly of the card reader with the components in place.

FIG. 7 shows an end view of the card reader with a magnetic or similar card inserted in the card reading device for purpose of reading.

DESCRIPTION OF THE PREFERRED EMBODIMENT

Figure 1:
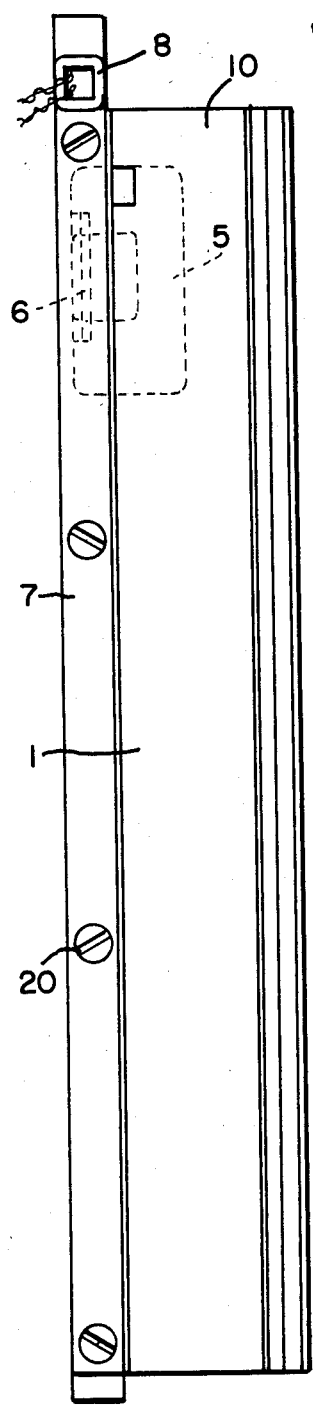
FIG. 1 shows a card reader assembly as viewed from its left side according to the present invention.
Figure 2:
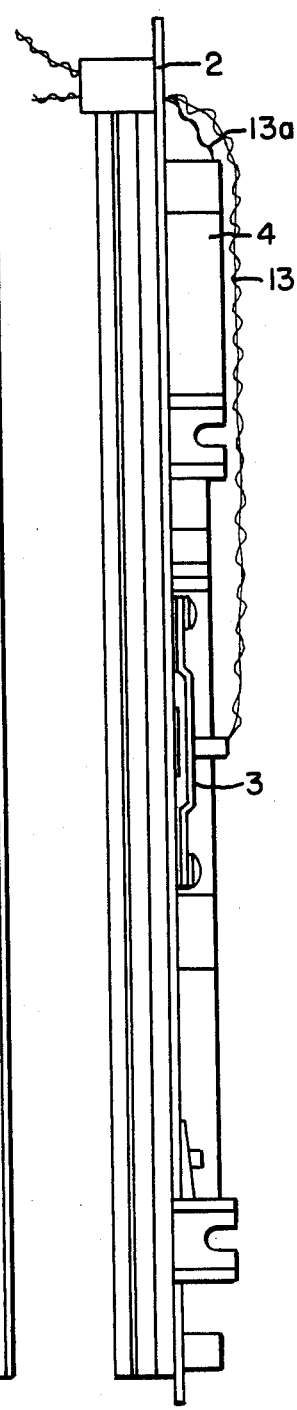
FIG. 2 shows a card reader assembly according to the present invention as viewed from the front.
Figure 3:
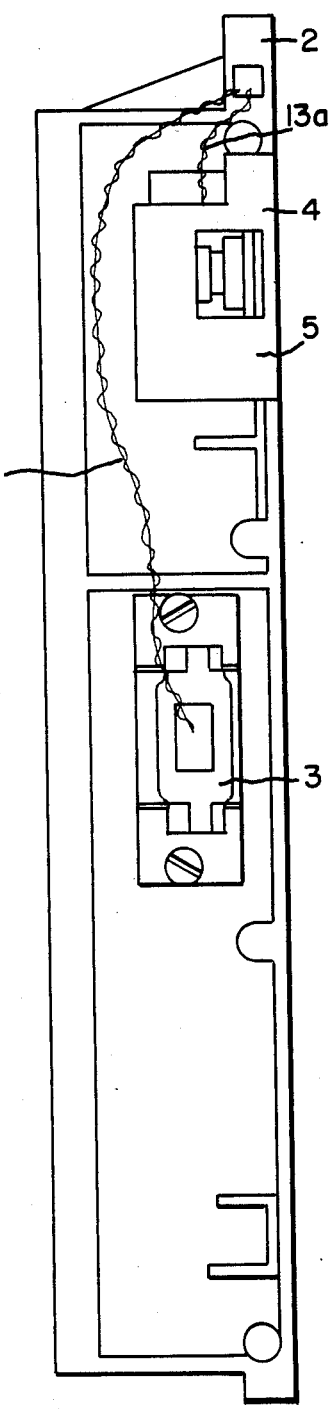
FIG. 3 shows a card reader assembly according to the present invention as viewed from its left side.

Referring now to FIGS. 1 through 3 and 6 a weather resistant card reader according to the present invention is shown in left side, the front, right side, and end view respectively. The card reader assembly 1 comprises a planar card reader frame 2 manufactured of a molded polycarbonate or similar weather resistant material. Mounted on the card reader frame 2 is a magnetic strip card reader 3 of conventional type. Also mounted to the card reader frame is a wakeup switch retainer 4 to which is mounted a wakeup switch assembly 5. The wakeup switch is activated by an actuator 6 which contacts a magnetic card when it is inserted in the card reader assembly as shown in FIG. 7. The actuator is a simple lever assembly which converts the card entry to motion which is sensed by the wakeup switch. The wakeup switch 5 activates a card reader circuit which then permits the card reader assembly to function on demand without continuous battery drain.

A pair of twisted contact wires 13 and 13A provide electrical contact to the card reader and wakeup switch respectively. The contact wires 13 and 13A may be routed through a wire duct 8 to connect to the operating circuits not shown. To this point of the description the card reader is typical of slot type card readers wherein a card is inserted and moved in a linear motion past the card reader in order for the data on the card to be read.

The present invention is concerned primarily with the unique weather resistant feature provided by protective leaf spring 10. As shown in FIG. 1 protective spring 10 is mounted to the card reader frame 2 by means of a clamping plate 7 and clamping screws 20. The clamping plate 7 and clamping screws 20 provide mounting security and preload for protective spring 10.

The following description and relationship may be appreciated by referring to FIGS. 4 and 5. The protective spring comprises a uniquely formed bent plate which is straight along its longitudinal axis but has formed in it a deformation in its width as best seen in FIG. 5 providing a contact point 11 and a guide tab 12. The protective spring 10 is further provided with locating holes 14 and clamp screw holes 15 along its left edge as shown in FIG. 4 corresponding to the left side view of FIG. 1. The mounting holes 14 and clamp screw holes 15 align with mating screw holes on the frame 2 and clamping plate 7 on assembly. Clamping screws 20 facilitate assembly.

The deformation forming contact point 11 and guide tab 12 is to the right of FIG. 4 and FIG. 1 as shown. A clearance hole 13 has been provided for the wakeup switch actuator tip in the design of the preferred embodiment. However, this is not feature of the present invention and may be eliminated for other actuator designs.

Referring now to FIGS. 6 and 7 a card reader according to the present invention is shown in its end view. In FIG. 6 the card reader frame is shown inserted in a lock casing 25. In a conventional relttionship the card reader frame is secured to the lock casing in a conventional manner not shown. However, as shown in FIG. 6 the card reader frame may form a seal with the lock casing and the door 30 on which it is mounted or in the alternative a bottom plate for the lock casing.

It should be appreciated by one skilled in the art that with the use of the wire duct 8 and the seals between the lock casing 25 and the card reader frame that the areas to the right and/or left of the card entry or casing slot 30 may be sealed from exterior contaminants entering the casing slot 30. In addition, it should be appreciated by one skilled in the art that the protective spring 10 further seals the card guide slot 31 and hence the area served by the wakeup switch 5 and the card reader 3 from external contaminants.

As shown in FIG. 6 the card guide slot is formed between the card reader frame 2 and a card support plate 32. The card support plate forms the card guide in conjunction with the card reader frame. A land 33 forms an edge guide for the card. The resulting cavity 40 formed by the card support plate 32 and the card reader frame 2 is sealed by protective spring 10.

As shown in FIG. 7 a magnetic card 35 may be inserted in the card guide slot 31 towards the top of the slot as shown in FIG. 1 to engage the wakeup switch. The card may then be manually moved vertically downward past the card reader and withdrawn. As shown in FIG. 7 the protective spring 10 forms a seal both with the card inserted and as shown in FIG. 6 when the card is removed. In addition, an important feature of the protective spring 10 is to provide a degree of feel to the card insertion which improves card reading by stabilization and further prevents the card from accidentally falling out of the card reader should the operator lose grip on the card at the end of the card passage.

For purposes of the preferred embodiment it has been found that a protective spring manufactured from 302 half hard stainless steel of approximately 20 gauge thickness provides a reasonable compromise between seal pressure or the degree of force necessary for the card to enter the slot, security of tamper access and protective characteristics.

It should further be appreciated by one skilled in the art that the contact point 11 in contacting card reader frame 2 provides a line contact seal which both cleans debris or the like from a card which is inserted in the card reader and prevents moisture or debris from entering the card guide slot during periods of time when a card is not inserted. The device of the present invention therefore performs a dual function of protection and feel for the process of card reading as well as other benefits as will now be understood by one skilled in the art.

Having described my invention in terms of a preferred embodiment I do not wish to be limited in the scope of my invention except as claimed.

I claim:

1. A weather resistant card reader comprising: a card reader frame; a means for reading a card containing pertinent information mounted to said frame; means associated with said base for receiving and guiding said card in a prescribed path relative to said frame; and a protective spring means forming a closure of said means for receiving and guiding said card guide means.

2. A card reader according to claim 1 wherein: said protective spring means comprises a bent plate leaf spring.

3. A card reader according to claim 2 wherein: leaf comprises a planar plate having an accurately bent edge.

* * * * *